United States Patent [19]

Linder et al.

[11] Patent Number: 4,767,645

[45] Date of Patent: Aug. 30, 1988

[54] COMPOSITE MEMBRANES USEFUL FOR THE SEPARATION OF ORGANIC COMPOUNDS OF LOW MOLECULAR WEIGHT FROM AQUEOUS INORGANIC SALTS CONTAINING SOLUTIONS

[75] Inventors: Charles Linder, Rehovot; Mara Nemas, Neve Monoson; Mordechai Perry, Petach-Tikva; Reuven Kotraro, Rishon-Letzion, all of Israel

[73] Assignee: Aligena AG, Basel, Switzerland

[21] Appl. No.: 39,421

[22] Filed: Apr. 17, 1987

[30] Foreign Application Priority Data

Apr. 21, 1986 [GB] United Kingdom ................. 8609653

[51] Int. Cl.$^4$ ............................................. B05D 1/18
[52] U.S. Cl. .................................. 427/386; 427/385.5; 427/393.5; 427/412.1; 427/412.3; 427/412.4; 427/412.5
[58] Field of Search .................. 427/385.5, 386, 393.5, 427/412.1, 412.3, 412.4, 412.5

[56] References Cited

U.S. PATENT DOCUMENTS 3951815 4/1976 Wrasidlo ........................ 210/500 M
4039440 8/1977 Cadotte ............................ 210/23 H
4360434 11/1982 Kawaguchi et al. ............ 210/500.2

FOREIGN PATENT DOCUMENTS 8945 3/1980 European Pat. Off. .
10425 4/1980 European Pat. Off. .
56175 7/1982 European Pat. Off. .

*Primary Examiner*—Bernard D. Pianalto
*Attorney, Agent, or Firm*—Wenderoth, Lind & Ponack

[57] ABSTRACT

Semipermeable composite membranes suitable for separating organic compounds of low molecular weight from aqueous, inorganic salts containing solutions are provided. These membranes are obtained by coating one side of a membrane support with an aqueous solution containing dissolved therein an organic, film-forming, hydrophilic polymer, and a cross-linking agent (1) and optionally ionic monomeric compounds to form at least one polymer layer, contacting the still wet polymer layer(s) interfacially with an organic solution of a cross-linking agent (2), containing at least two functional groups, drying the resultant product for a time sufficient to form the composite membrane comprising the membrane support and an asymmetrical coating consisting of polymer layer(s) and a thin semipermeable cross-linked film, containing ionic groups resting on the top of said layer and being integrally attached thereto.

Optionally the membranes can be further stabilized by treating them with an aqueous solution containing a cross-linking agent (3) capable of reacting with the polymer and/or unreacted groups of the monomeric compound, followed by a curing step.

The membranes are suitable to separate organic compounds with molecular weights of less than about 300 from aqueous salt containing solutions.

23 Claims, No Drawings

COMPOSITE MEMBRANES USEFUL FOR THE SEPARATION OF ORGANIC COMPOUNDS OF LOW MOLECULAR WEIGHT FROM AQUEOUS INORGANIC SALTS CONTAINING SOLUTIONS

The present invention relates to semipermeable composite membranes having high rejection to compounds of low molecular weight and simultaneously a good salt passage. They are suitable for a selective separation of said components from fluid (aqueous) mixtures or solutions containing them together with inorganic compounds, such as inorganic salts.

It is quite often necessary to separate low molecular weight organics from salts, such as sodium chloride and sodium sulfate, or vice versa. The best membranes to date can either reject everything or separate efficiently sodium chloride from organics with molecular weights above 400 to 600. The separation of sodium chloride or sodium sulfate from organics with molecular weights below 400 has not been sucessfully achieved.

Composite membranes for aqueous stream desalination are known in the state of art. U.S. Pat. No. 4,039,440 describes e.g. membranes with more than 90% rejection to sodium chloride.

These composite membranes have found useful application in water treatment and industry for the concentrations and rejection of salts (especially sodium chloride) and many organic molecules. These membranes are essentially nondiscriminatory in rejecting most species. It is also generally accepted that with such membranes divalent salts, such as sodium sulfate, have significantly higher rejections than monovalent salts, such as sodium chloride.

Composite membranes with salt passage and organic molecule rejections are also known (EP-A-No. 56 175, U.S. Pat. No. 4,259,183). The rejections are in all cases for organic solutes above about 400 and the sodium chloride passage is greater than 50%. The rejections of divalent ions are above 50% and generally above 90%. There is, however, an increasing need to separate organic solutes of molecular weights of 400 or less from sodium chloride and/or divalent salts such as sodium sulfate. This selectivity is not achievable with state of the art membranes; nor are the methods for achieving such membranes described.

According to the present invention, however, unique composite barriers with the desired selectivities between salts and organic species are described. The organic species have molecular weights of less than about 300 and are e.g. in the range of 150 to 300, and the salts refer to alkali metal salts, such as lithium, sodium or potassium halides, especially the chlorides such as preferably sodium chloride;or sodium sulfate.

It is therefore one object of the present invention to provide a process for the preparation of improved semipermeable composite membranes suitable for separating organic compounds of low molecular weight from aqueous, inorganic salts containing, solutions.

Another object of this invention is to provide said semipermeable composite membranes having said improved selectivity.

Still another object of this invention is to provide a method for using the aforesaid semipermeable composite membranes for the reverse osmotic separation of low molecular weight organics from aqueous inorganic salts containing, solutions.

Other objects and advantages of this invenfion will become apparent from the following description.

According to the present invention, there is provided a process for the preparation of a semipermeable composite membrane suitable for separating organic compounds of low molecular weight from aqueous, inorganic salts containing solutions, which process comprises the steps of (a) coating one side of a membrane support with an aqueous solution containing dissolved therein an organic, film-forming, hydrophilic polymer, a cross-linking agent (1) and optionally a monomeric ionic compound to form at least one polymer layer, (b) contacting the still wet polymer layer interfacially with at least one organic solution of a cross-linking agent (2), containing at least two functional groups, (c) drying the product of step (b) for a time sufficient to form the composite membrane comprising the membrane support and an asymnetrical coating consisting of at least one polymer layer and a thin semipermeable cross-linked film, containing ionic groups, resting on the top of said layer and being integrally attached thereto, (d) optionally treating the membrane of step (c) with an aqueous solution containing cross-linking agents (3) capable of reacting with the polymer and/or unreacted groups of the monomeric compound, at least one of said hydrophilic polymer, monomeric ionic compound and cross-linking agents (1) to (3) used in this process containing cationic, amphoteric, or preferably anionic groups or groups transferable into anionic groups, and (e) optionally curing the membrane of step (d) at elevated temperature.

The objective of the invented procedure is the chemical modification of a membrane support (ultrafiltration or microporous support) with a sequence of immersion and coating steps, combined with chemical reactions to cross-link the coating and charge ionically or alter it with respect to the hydrophilic/hydrophobic (lipophilic) balance (HLB).

The aforementioned support upon which this sequence is carried out, must be considered in designing the chemical modification sequence. In effect the support is of asymmetrical structure of approximately three regions or zones. For example, the surface on which the coating rests, contains nanometer sized pores varying from 0.5 to 50 nm. Below this surface region is a spongy more open layer and below this the remainder of the support are large micron sized pores, enlarging towards thebackof the support. The support is not limited to this order of magnitude.

The coating which sits within the pores and the spongy layer may have a marked influence on the rejection of salts. Thus the physicochemical properties within this region must be so designed as to permit salt and water passage. The coating may extend 10 to 10 000 nm upward from the surface of the support. The uppermost region of the coating of 1 to 5000 nm thickness has different physico-chemical properties than the remainder of the coating, which extends from the boundary of this uppermost region to the surface of the support and into the upper region of the support. This difference is brought about by a controlled chemical reaction on the surface, which penetrates to a given depth. This demarcation between the two regions of the coating will have a profile governed by the rate of diffusion of the crosslinking reagents and the rate of diffusion of monomers which diffuse into the interface from the coating.

Crosslinking reagents may also be included within the entire coating to stabilize the membrane, and superimposed on this, is the interfacial crosslinking of the uppermost region. Crosslinking reagent, while stabilizing the coating also modify the HLB-value as a function of their chemical structure. Crosslinkers containing ionic groups increase hydrophilicity and ion exchange capacity. Crosslinkers with hydrophilic groups increase hydrophilicity and hydrophobic groups increase lipophilicity.

Selectivity of the inventive composite membranes is achieved in that the uppermost region of the coating acts to sterically reject the organic molecules, while inorganic ions are transported across this thin region and the remainder of the coating due to a combination of pore size and/or of functional groups within this region, which increase salt uptake.

Further, the uppermost region contains ionic groups, such as cationic, amphoteric or preferably an excess of anionic groups (especially sulfonic and carboxylic acid groups), which repel potential anionic organic foulants. It is important that this upper layer is relatively dense and charged, yet thin enough and permeable via uptake to allow salt passage. The physico-chemical properties of the second region of the coating under the topmost layer must offer the minimum resistance to salt and water transfer. Thus the uppermost region of the coating is a dense charged layer, which rejects organic compounds of molecular weights of about 150 or higher. The remainder of the coating, which extends to the surface of the membrane support and into the pores, is modified (cross-linked) qualitatively and quantitatively different than the uppermost portion and contains groups with salt uptake properties. This layer must also allow for a high water passage. Since it is thicker than the uppermost layer, it is usually less extensively chemically modified (cross-linked).

The preferred suppoerts are asymmetrical porous materials (membranes-ultrafiltration or microporous membranes) with pores ranging from 1 to 100 nm. A typical support is with a polysulfone, e.g. a polyethersulfone (Victrex PES ®—trademark), dissolved in N-methylpyrrolidone (NMP), cast on a nonwoven substrate at 0.2 mm and gelled in a water bath. The resulting membranes contain pores for example of 5 to 60 nm with an average of about 20 nm. The preferred membranes may also be characterized by their water flux. Water fluxes of preferably 10 to 20,000 $l/m^2 \cdot h$, at 1 bar may be used. Fluxes below or above give final modified membranes with too low flux or too low rejections.

Membrane materials for the asymmetrical support may be chosen e.g. from among cellulosics, aromatic polysulfones, polyacrylonitriles and copolymers on the basis of acrylonitrile, polyamides, polyvinyl/vinylidene chlorides and copolymers on the basis of vinyl chloride/vinylidene chloride, epoxy resins, polyphenyleneoxides, polycarbonates, polyheterocyclics, copolymers containing in part heterocyclic rings, polyvinylidene fluorides, polytetrafluoroethylenes, polyesters, polyamides, polyelectrolyte complexes, polyolefines, polyetherimides, polyetherketones, polyamideimides, polyimides and mixtures thereof.

Preferred polymers are cellulose acetates, polyacrylonitriles, polyamides, polyvinylidene fluorides or polytetrafluoroethylenes and preferably aromatic polysulfones.

The aromatic moieties of these polymers may be derivatized with carboxyl, ester, sulfonic, amino, nitro, quaternary ammonium halomethylated, haloethylated and haloformylated groups.

Membrane (support) casting may be performed by any number of casting procedures cited in the literature (for example U.S. Pat. No. 4,029,582, GB-A-No. 2,000,720, U.S. Pat. No. b 3,556,305; 3,615,024; 3,567,810). Thus, the polymer or its derivatives, may be dissolved in a suitable solvent or mixture of solvents, for example N-methylpyrrolidone (NMP), dimethyl formamide (DMF), dimethyl sulfoxide (DMSO), hexamethylphosphoramide, N,N-dimethylacetatamide or dioxane, which may or may not contain cosolvents, partial solvents, non-solvents, salts, surfactants or electrolytes, for altering or modifying the membrane morphology and its flux and rejection properties, e.g. acetone, ethanol, methanol, formamide, water, methylethyl ketone, triethyl phosphate, acids such as $H_2SO_4$, HCl, partial esters of fatty acids and sugar alcohols or their ethylene oxide adducts, sodium dodecyl sulfate (SDS), sodium dodecylbenzene sulfonate, sodium hydroxide, potassium chloride, zinc chloride, calcium chloride, lithium nitrate, lithium chloride, magnesium perchlorate, etc.).

The casting solution may be filtered by any of the known processes, e.g. pressure filtration through microporous filters or by centrifugation, and cast on a substrate (carrier) such as glass, metal, paper, plastics, etc., from which it may then be removed. It is preferred, however, to cast on a porous substrate material from which the membrane is not removed. Such porous substrates may be non-woven or woven clothes of organic materials such as cellulosics, polyethylene, polypropylene, nylon, polyvinyl chloride and its copolymers, polystyrene and polyethylene terephthalate (polyesters), polyvinylidene fluoride, polytetrafluoro ethylene and glass fibers. The membrane may alternatively be formed as a hollow fiber or tubelet, not requiring a substrate for practical use.

The concentration of polymers in the casting solution for casting the support may vary as a function of its molecular weight and additives between 5 to 80%, but preferably between 10 and 50%, and most preferred between 15 to 30% by weight. The temperature of casting may vary from $-20°$ to $100°$ C., but the preferred range is between $0°$ to $60°$ C., varying as a function of the polymer, its molecular weight, and the cosolvents and additives, in the casting solution. The polymer casting solution may be applied to the above mentioned substrates by any of the well known techniques, known to those practised in the art. The wet film thickness may vary between $5 \cdot 10^3$ to $2 \cdot 10^6$ nm. The preferred range bein $5 \cdot 10^4$ to $8 \cdot 10^5$ nm and the most preferred $1 \cdot 10^5$ to $5 \cdot 10^5$ nm. The wet film and support may then be immersed immediately, if after a partial evaporation step (from 5 sec to 48 hours) at ambient condition or elevated temperature, or vacuum or any combination thereof into a gelling bath of a non-solvent. Such baths are usually water, or water with a small percentage of a solvent (e.g. dimethylformamide—DMF, or N-methylpyrrolidone—NMP) and/or surfactants (e.g. sodium dodecyl sulfate—SDS) at a temperature of $0°$ to $70°$ C. An example of a commonly used gelling bath is water with 0.5% SDS at $4°$ C. In another mode of forming membranes, a polymer solution containing a component that may leached out in water or another solvent, is cast and dried before immersion. After immersion, leachable material is removed resulting in a porous membrane.

In a third variation, a polymer solution without any leachable materials is cast and taken to dryness, resulting in a porous membrane by virtue of the physicochemical properties of polymeric material-solvent combination or by a subsequent chemical reaction that creates pores. All the above methods may be used to form membranes for further modification (coating) as described by the present invention.

Hydrophilic polymers (coating polymers) are used to coat the semipermeable membrane support. There may be one or even more than one coatings, preferably one or two coatings of the hydrophilic polymers present on the support. The preferred hydrophilic polymers are polyfunctional oligomers or polymers, which contain active hydrogen atoms bound to oxygen, sulfur or preferably nitrogen atoms. The nitrogen atoms may be present as aliphatic (acyclic or cyclic), aromatic, or heterocyclic amino groups, which can be primary, secondary or tertiary. Or alternatively, but less preferred, they may be polymers of hydroxyl or thiofunctions. Examples of such polymers are polyethyleneimines (M.W. of 150 to 200,000), polyvinyl alcohols and partially esterified polyvinyl alcohols, polyvinylamines, polyvinylanilines, cellulose derivatives, polybenzylamines, polyvinylmercaptans, polymers of 2-hydroxyethyl- or 2-aminoethyl-methylacrylates, and polymers defined in European Patent Application EP-A No. 10 425, polyvinylimidazolines, amine modified polyepihalogenhydrins (described in GB No. 1,588,807), polydiallylamine derivatives, polymers containing piperidine rings (described in GB No. 2,027,614), amino polysulfones, amino polyarylene oxides (amino ethylated polyphenylene oxide), amine modified polymers on the basis of epoxides, hydrophilic amino groups containing polymers, polyamide-polyamine-epichlorohydrin condensation products, condensation products of dicyandiamide, amine (ammonium) salts and formaldehyde (U.S. Pat. No. 3,290,310), and copolymers of styrenesulfonate (sodium salt)/vinyl-aniline, 2-amino-ethylmethacrylate/acrylic acid, vinyl-aniline/vinyl-benzyltrimethylammoniumchloride or vinylamino/vinylsulfonate.

The above polymers may be in part copolymers or polymers containing other monomeric units, block polymers or graft polymers. If they are copolymers, the other monomeric units may or may not contain ionic groups ($-SO_3^{\ominus}$, $-COO^{\ominus}$, $-N^{\oplus}(R_3)$). The coating polymers described in EP-A No. 31 730, EP-A No. 72 002 and EP-A No. 56 175 may be used in the inventive process, too.

Examples of preferred copolymers are the copolymers mentioned above, such as styrenesulfonate (sodium salt/vinyl-aniline, 2-aminoethylrethacrylate/acrylic acid, vinyl-aniline/vinyl-benzyltrimethylammoniumchloride or vinylamine/vinylsulfonate).

Preferred polymers are polyethyleneimines, polyvinylalcohols, cellulose derivatives, polyvinylamines, polyvinylanilines, polypiperidines, polydiallylamine derivatives or amine modified polymers on the basis of epoxides or epihalogenhydrins as well as the copolymers exemplified above.

One especially preferred polymer comprises poly-aliphatic (acyclic or cyclic) amines. Polyethyleneimine is an example of this group. The range of molecular weights may be between 150 to 2,000,000, but preferably between 1000 and 200,000 and most preferred between 10,000 and 70,000. Low molecular weight polymers or oligomers (150 to 1000) may be used, but the increase in solute rejection of the final membrane is not as great when higher molecular weight polymers are used.

In another preferred case, water soluble amphoteric or block mosaic polymers containing both cationic and anionic groups, together with a reactive function (for example, $-NH_2$ or $-OH$ groups) for reaction with the polyfunctional cross-linking agents, are useful for forming a mixed charge membrane. These membranes are particularly useful for separating salt from relatively low molecular weight organic solutes. An example of such a coating polymer is poly(vinyl-amine-vinylsulfonate) or partially quaternized derivatives.

Water is the preferred solvent for the aforementioned coating polymers, though other solvents, such as low molecular weight alcohols or ketones, may be used alone or in combination with water. The range of polymer concentration may be from 0.1 to 80%, but preferably between 1 and 30%, and most preferred between 0.1 and 15% by weight. Liquid polymers can be used without solvents that are as pure (100%) agents too The concentration of polymer needed to achieve optimum rejection and flux characteristics is a function of the molecular weight of the polymer, molecular dimensions, support membrane porosity and pore size, temperature, time of immersion, pH and subsequent washing steps. The temperature of the polymer solution during membrane immersion may vary from 0° to 90° C. The optimum temperature is a function of adsorption rates. The time of immersion may vary between 1 minute to 48 hours as a function of the temperature, pH-value, concentration, and the molecular weight dimensions and solution properties of the coating polymer.

The coating is carried out that there is at least one layer formed; that means that there may be two or even more layers present, mostly preferred is one polymer layer.

The ionic monomeric compounds added to the coating polymers may play one or more important functions. They may assist the crosslinking of the coating layer, and/or to confer charge groups within the coating and/or to react with a crosslinking agent, but per se they do not react prior to the interfacial polymerisation/cross-linking. This last crosslinking agent may be applied to the coating in a solvent, which penetrates the coating, or in a water immiscible solvent where by application of the latter interfacial cross-linking and/or polymerisation condensation reaction occurs. The monomeric compounds (reactive condensation monomers) added to the coating layer act to stabilize the coating and/or to modify the physico-chemical properties required for the desired selectivity. The crosslinking agents or monomeric compounds must not, however, bring about a too hydrophobic structure as to lower water flux. Nor must it alter the physico-chemical properties of the coating to increase its rejection to the salt solutes. In general the monomers are hydrophilic. The so-called monomeric compounds are e.g. aromatic, such as dihydroxy, dimercapto or preferably diaminophenyl or naphthyl compounds containing ionic (anionic or cationic) moieties, such as carboxylic or sulfonic acid (present as anionic species $-COO^{\oplus}$ and $-SO_3^{\oplus}$ under the reaction conditions), quaternary ammonium, sulfonium or phosphonium groups.

Examples of such useful monomers are ionic derivatives of 2,6-diaminopyridine, 1,4-piperidine, 2,4-diaminotoluene, 2,6-diaminophenol, benzidine and 4-methoxy-m-phenylene-diamine. Especially useful are 1,4-diaminobenzoic acid (DABA), 1,4-diamino-sulfonic acid (DABS) and 1,4-diaminotrimethylammonium benzene bromide. Aliphatic diamines with a certain water-solubility may be used, too.

For the working of the present invention it is preferred to have hydrophilic and/or ionic cross-linking agents. Thus cross-linking agents (1) which modify the coating polymer, containing at least two functional groups, may be ionic or non-ionic ones. Their functional (reactive) groups may be the same or different. They possess cross-linking properties and can enter into at least two chemical bondings with the coating polymer. They are—as a rule—applied together with the hydrophilic polymer from auqeous media. Optionally they can be applied in a separate step but this is not the preferred method.

These cross-linking agents possess their reactivity by virtue of at least two functional atoms or groups which comprise non-acyl bound halogen atoms, or epoxide, aziridine, aldehyde, imidate, carboxylic acid anhydride, carboxylic acid ester, halogenhydrine, N-methylol or tertiary amino groups, or reactive multiple bonds, wherein the bonds or groups may be further substituted, or combinations thereof. The compounds contain, for example the groupings

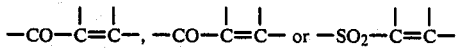

as a multiple bond to which further substituents (halogen atoms, carboxylic acid) can be added on. The polyfunctional compounds can contain quaternary ammonium groups, which are split off as tertiary amines, for example, a trimethylammonium or pyridinium group or sulfonium groups, as the leaving groups. However, they preferably contain substituents with groups that split off as an anion (leaving atom), and preferably containing a reactive halogen atom, as the reactive group. These leaving groups possess their reactivity by virtue of, for example, the influence of electrophilic groups, such as the —SO— or —SO$_2$— group in saturated aliphatic radicals. They also posses their reactivity by virtue of the influence of a quaternary nitrogen atom, such as in the group

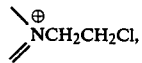

or in aromatic radicals by virtue of the influence of electrophilic groups in the o- and p-position, for example, nitro, hydrocarbonsulfonyl or hydrocarboncarbonyl groups, or of the bond to a ring carbon atom, which is adjacent to a tertiary ring nitrogen atom, as in halogenotriazine or halogenopyrimidine radicals.

"Non-acyl bound" halogen atoms in this context mean that aromatic compounds useful as cross-linking agents and containing acyl halide groups ("acyl bound halogen atoms") such as —COCl or —SO$_2$Cl groups as well as the trihalotriazines (containing chloro, bromo and/or fluoro atoms) are excluded. These compounds are excluded because of their high reactivity which leads to chemical reactions with the coating polymer before this is coated onto the support.

Polyfunctional compounds which have proven particularly advantageous as cross-linking agent (1) are ionic or non-ionic cyclic carbonic acid imidehalides (except for trihalotriazines) and in particular halogenodiazines containing at least two reactive substituents or halogeno triazine derivatives containing two reactive substituents (halogen atoms), as well as non-ionic, di-, tri- or tetra-epoxides (polyepoxides). Tetrachloropyrimidine and in particular cyanuric chloride derivatives containing two chloro atoms have proven particularly advantageous.

The cyclic carbon acid imide-halides used are advantageously primary condensations products of s-triazines containing two identical or different halogen atoms bonded to carbon atoms, for example, such products obtained from cyanuric chloride, cyanuric fluoride or cyanuric bromide, with water, ammonia, aliphatic amines (alkylamines), aromatic amines (anilines), alkanols, alkylmercaptans, phenols or thiophenols; pyrimidines containing at least two reactive, identical or different halogen atoms, such as 2,4,6-trichloro-, 2,4,6-trifluoro- or 2,4,6-tribromo-pyrimidine, which can be further substituted in the 5-position, for example by an alkyl, alkenyl, phenyl, carboxyl, cyano, nitro, chloromethyl, chlorovinyl, carbalkoxy, carboxymethyl, alkylsulfonyl, carboxamide or sulfonamide group, but preferably by halogen, for example chlorine, bromine or fluorine. Particularly suitable halogenopyrimidines are 2,4,6-trichloro-and 2,4,5,6-tetrachloro-pyrimidines; further derivatives of pyrimidines similar to those mentioned above for the triazines (alkyl, alkanol and alkoxy comprise 1 to about 6, alkenyl 2 to about 6 carbon atoms).

One familiar with these reactive (polyfunctional) compounds will readily realize that the concept here presented is adaptable not only to the triazines and diazines (pyrimidines) as mentioned but also to related cyclic compounds derived from quinoxalines, quinazolines, phthalazines, benzthiazoles and benzoxazoles, pyridazonyls, as well as other compounds containing at least two reactive substituents such as urea and melamine derivatives; further aziridines, acid anhydrides, dialdehydes, chlorohydrines, activated esters, conpounds containing olefinic double bonds, such as halogenated acrylic and methacrylic acids or amides, or vinyl compounds, halogenoalkyl (cycloalkyl) carboxylic acids of 2 to 4 carbon atoms or alkylsulfonyl or alkylaminosulfonyl groups containing compounds.

The preferred polyfunctional ionic cross-linking agents (1) are ionic derivatives of triazinyl or pyrimidinyl compounds. Reactive azo dyes containing halogenotriazinyl and pyrimidyl as well as other reactive groups belong to this class as do non-colored compounds with the aforementioned functions.

The ionic reactive dyes can belong to various categories and are, for example, anthraquinone, formazan or preferably azo dyes, optionally in form of their metal complexes. Suitable reactive groups (which are part of the dyes) are the following: carboxylic acid halide groups, sulfonic acid halide groups, radicals of α,β-unsaturated carboxylic acid or amides, for example, of acrylic acid, methacrylic acid, β-chloroacrylic acid, β-bromoacrylic acid or acrylamide radicals of preferably low halogeno-alkylcarboxylic acids, for example, of chloroacetic acid, α,β-dichloropropionic acid or α,β-dibromopropionic acid; radicals of fluorocyclobutanecarboxylic acids, for example, of trior tetrafluorocyclobutane-carboxylic acid; radicals containing vinylacyl groups, for example, vinylsulfone groups or carboxyvinyl groups; radicals containing ethylsulfonyl (—SO$_2$CH$_2$CH$_2$OSO$_2$OH, —SO$_2$CH$_2$CH$_2$Cl) or ethylamino sulfonyl groups (—SO$_2$NHCH$_2$CH$_2$OSO$_2$OH) and halogenated heterocyclic radicals such as dihaloquinoxalines, dihalopyridazonyl, dihalophthalazines, halobenzolthiazoles and preferably halogenated pyrimidines or 1,3,5-triazines such as dihalotriazines; 2,4-dihalopyrimidines or 2,4,6-trihalopyrimidines, Suitable halogen atoms are fluorine, bromine and especially chlorine atoms.

Ionic groups, which cross-linking agent (1) can contain are, for example, sulfato groups, sulfonic acid groups, carboxylic acid groups, ammonium groups formed from primary, secondary or tertiary amino groups and hydrogen, or quaternary ammonium groups and also phosphonium or sulfonium groups. Particularly advantageous results are achieved with substances containing sulfonic acid groups, and quaternary ammoniums.

Preferred reactive groups present in the ionic cross-linking agent (1) are dichlorotriazinyl, 2,4-dichloropyrimdinyl, 2,3-dichloroquinoxaline-6-carbonyl, 4,5-dichloropyridazonylpropionyl, 1,4-dichlorophthalazine-6-carbonyl, chlorobenzothiazole linked to the dye via —CONH—, SO$_2$NH—, —NH—Ar—N═N— (Ar═phenylene or naphthylene), 5-chloro-4-methyl-2-methylsulfonyl—pyrimidinyl, vinylsulfonyl, β-sulfatoethylsulfonyl, β-sulfatoethyl aminosulfonyl, β-chloroethylsulfonyl or β-Sulfatopropionamido.

Reactive azo dyestuffs may also be used containing sulfonic acid (—SO$_3$H) or carboxyl (—COOH) groups (either group may be also present in salt form, such as alkali metal salt (sodium salt) and as reactive groups, dichlorotriazinyl, 2,4-dichloropyrimidinyl, vinylsulfonyl, β-sulfatoethylsulfonyl, β-chloroethylsulfonyl or β-sulfatoethylaminosulfonyl radicals.

Both di- and polyepoxides (tri- or tetraepoxides etc.) are also preferred. For example butane-1,4-diglycidylether (diepoxide), triepoxides as for example the condensation product of glycerol and epichlorohydrine, tetraepoxides, such as of the formula (5), hereinafter, and polyepoxides, such as polyamide-polyaminoepichlorohydrine resins.

Equally useful are the chlorohydrin derivatives of these glycerol compounds, which react upon heating or pH-adjustment.

An effective cross-linking agent can form chemical bonds, but acts also by electrostatic interactions of ionic groups, and by chelation or coordination of polymeric functions with metal ions. The preferred mode of cross-linking is via a covalent bond, though the other two modes may also be used. In some cases all three modes of cross-linking may be operative via application of a single component, or may be reached by sequential or parallel application of 2 or 3 different compounds (e.g. a reactive dyestuff and a metal salt).

Multivalent metal salts that may find application in cross-linking said film via chelation or coordination bonds, are for example, CuSO$_4$, CrCl$_3$ and FeCl$_3$. These salts may be applied alone, in combination with each other, or in combination with covalent (ionic) binding compounds.

The ionic or non-ionic cross-linking agents (1) and the monomeric ionic compounds together can be applied from 0.02, preferably 0.11 to 20% aqueous solutions (suspensions) to the coated hydrophilic polymer, or within the solution containing the coating polymer if the reactivity is controlled. The cross-linking agent being present in an amount of 0.01 to 10% and the monomeric ionic compound in an amount of 0.01, preferably 0.1 to 10%. Preferably these solutions contain 0.01 to 10% or 0.5 to 10% or 0.5 to 5% by weight of the cross-linking agents (1) and 0.1 to 10% by weight of the monomeric compound (percentages based on the weight of the whole solution). About 0.05 to 25 milliequivalents/g of the cross-linking agent (1) may be present (bound) in the polymer film of the membrane.

Non-ionic cross-linking agents (1) are used as a rule together with ionic ones; these latter are preferably used first followed by the non-ionics. If there are already ionic groups present in the coating polymers (anionic groups or anionic and cationic groups such as in amphoteric polymers) the introduction of further charges into the surface of the membrane is not necessary; a cross-linking step with non-ionic cross-linking agents is sufficient.

The ionic agents serve to introduce positive or negative charged (ionic) groupings into the membrane surface and/or the pores and to cross-link the membrane, and is effected in one or two stages.

The one-stage process means that the compounds carrying the charge and the so-called fixing agent (for example inorganic or organic bases such as alkali metal hydroxides) are used in one bath.

The two-stage process comprises first the step involving the adsorption of the compound carrying the charge and then, in a separate reaction solution, the fixing step (chemical reaction between the cross-linking agent and the coating polymer). The two-stage process is preferred since, on the one hand, the concentration of the polyfunctional compound in the adsorption solution can be kept lower and a solution of this type can optionally be used several times, and on the other hand, the total reaction time is shorter than in the case of the one-stage process.

In the two-stage process, the concentration of e.g. cross-linking agent (1) (a reactive dye) in aqueous solution can be about 0.5 to 3%; the adsorption is carried out, for example, at temperatures of 20 to 35° C. over a period of 2 to 60 minutes; the pH-value can be 4 to 8. Fixing can then be carried out in an aqueous solution, the pH-value of which has been adjusted to 9 to 12, and the reaction time can be about 30 minutes, The pH-value is adjusted to the desired value using any desired inorganic (sodium carbonate) or organic bases.

Once the coating (step (a)) has been applied, its upper surface must be modified to enable the rejection of the desired organic solute, while allowing the passage of salt molecules and to develop a tight nonfouling skin. Thus the purpose of the coating is to modulate the flow of ions through the pores of the asymmetrical support, while presenting a diversity of materials which allows for the formation of a thin semipermeable cross-linked film with the required physico-chemical properties upon the application of a cross-linking agent (2). This function is not achieveable by the asymmetrical support, as it is not sufficiently uniform on the molecular layer and the coating material within its pores, which must be adjusted to allow the transport of salts cannot be so adjusted by a step which only modifies the uppermost portion of the coating. Thus the said modification of the top surface of the coating is carried out by contacting the still wet polymer layer (1) with an organic solution of a cross-linking agent (2) containing at least two functional groups which react with this said surface layer of polymers and rective (condensation) monomers within the coating. The thickness of this layer is determined by the extent of diffusion of the cross-linker into the coating and the diffusion of monomeric compounds into the interfacial layer.

The cross-linking agents (2) for modifying the uppermost layer may be chosen from those compounds useful as cross-linking agents (1) with the proviso that they dissolve in water immiscible organic aprotic solvents, and in addition they are further compounds containing at least two functional groups the compounds being selected from trihalogeno triazines containing fluoro, bromo or preferably chloro atoms, isocyanates, isothiocyanates, sulfonyl halides and preferably carboxylic acid halides.

Preferably the cross-linking agents (2) are aromatic, heterocyclic, cycloaliphatic or acyclic compounds containing as functional groups at least two isocyanate, thiocyanate or reactive halogen atoms as in sulfonyl halide or carboxylic acid halides or in the halogeno di or triazines.

The aromatic structures may preferably be benzenes, naphthalenes or diphenyl ethers, ketones, sulfones, alkylenes or alkylidenes

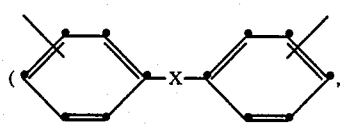

wherein X is —O—, —CO—, —SO$_2$—, C$_1$–C$_4$-alkylene, such as

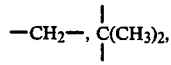

—CH$_2$CH$_2$— etc., or C$_2$–C$_4$-alkylidene such as —CH=CH—); the heterocyclic structures may comprise pyridines, pyrroles, furans or thiophens; aliphatic compounds are preferably those of 5 to 12 carbon atoms, containing said functional groups; halogen-diazines containing at least two reactive halogen atoms or trihalogeno-triazines are examples of preferred halogeno-di- or -triazines, derivatives thereof, such as alkoxy or preferably alkylamino derivatives of for example 1,3,5-trichlorotriazine (dichloroalkylaminotriazine) are suitable, too; a preferred diisocyanate is toluene-1,3-diisocyanate.

Cross-linking agent (2) based on triazine and diazine (pyrimidine) structures with reactive halogen atoms (especially chloro and bromo) are for example 1,3,5-trichlorotriazine (cyanuric chloride), dichloro alkylamino (2-butylamino-4,6-dichloro-1,3,5-triazine), dialkylamino or alkoxy derivatives (with alkyl/alkoxy groups of 1 to 6 carbon atoms, straight and branched) thereof, tetrachloro or fluoro-chloro-pyrimidines, pyrimidines and their alkylamino, dialkyl and alkoxy, phenyl and alkyl derivatives (alkyl and alkoxy in these derivatives comprise 1 to 6 carbon atoms). In addition to aromatic compounds, acyclic (aliphatic) or cycloaliphatic (each with 5 to 12 carbon atoms with acyclic or ring structure) polyfunctional compounds, containing the above reactive groups, may be used to practice this invention.

Formulae (9) to (22), below, show compounds suitable as cross-linking agents (2). The compound of formula (10) is a preferred one as well as the cross-linking agents isophthaloyl chloride, terephthaloyl chloride, benzene-1,3-disulfonyl chloride, benzene tetracarboxylic acid chloride, or toluene-1,3-diisocyanate. Mixtures of cross-linking agents (2) can be used likewise. Preferred mixtures are those of trimesoyl chloride with isophthaloyl chloride, terephthaloyl chloride, benzene-1,3-disulfonyl chloride, toluene-1,3-diisocyanate or 2-butylamino-4,6-dichloro-1,3,5-triazine, applied together or sequentially. Thex can be applied from one solution (solvent for example: n-hexane) like the mixture of trimesoyl chloride (TMC) (compound of formula (10)) and benzene-1,3-disulfonyl chloride (BDC) (compound of formula (12)), containing for example 0.3% of TMC and 0.1 to 0.2% of BDC, or from different solutions applied in series. TMC, for example, can be applied first and thereafter BDC or toluene-1,3-diisocyanate (TDI). This order of application has proved satisfactory (first TMC and then BDC or TDI, but not vice versa). The compound of formula (16) alone or combined with TMC give good results, too.

The organic solvents used to dissolve the cross-linking agents (2) may be chosen from hydrocarbons, such as hexane, heptane, petroleum ethers, naphtha, cyclohexanes and halogenated hydrocarbons, containing fluorine and/or chlorine atoms, such as methylene chloride, chloroform, tetrachloroethane, tetrachloroethylene or trichlorotrifluoroethane. Only such halogenated hydrocarbons (of 1 or 2 carbon atoms) should be used that do not dissolve the hydrophilic polymer or the membrane support. The concentrations of cross-linking agent (2) may vary between 0.01 to 15%, but preferably between 0.1 to 1.0% by weight, calculated on the weight of the solution. The cross-linking reaction between the aforementioned reagents and polymers and monomers of the coating may be adjusted by the use of surfactants, and proton-acceptors such as amines, alkali metal hydroxides, pyridine and its 2,6-dialkyl derivatives, phosphates, triethanol amine, N,N-diethylaniline and N-methylpiperidine.

An illustrative example of process steps (a) to (c) for preparing the inventive semipermeable composite membranes is a coating of polyethyleneimine (PEI) containing the epoxides of formula (4) (below) and diaminobenzene sulfonic acid (DABS) (step (a)). A coating of 2% PEI/1% DAPS/0.5% of the epoxide of formula (4) on a polysulfone support is reacted with 0.3% trimesoyl chloride (TMC) (formula (10)) in hexane (step (b)). The uppermost portion of PEI is cross-linked to the depth of the TMC penetration into the polymer/water layer. The DABS is continually diffusing to the surface and reacting with the TMC to form a charged layer (step (c)). If instead of DABS diaminobenzoic acid (DABA) is used, the rate of diffusion is changed and a layer of different thickness is formed. Steps (a) and (b) are carried out at ambient temperatures, whereas step (c) is carried out at higher temperatures such as 70° to 130° C.

For most applications it is desirable to have a negatively charged top layer to minimize fouling. This is due to the fact that many waste and production streams contain negative (organic) anions. In other applications, containing organic cations, a cationic top layer is to be preferred. The charge of this top layer may be brought about by (1) the charge of the hydrophilic coating polymer forming polymer layer,
(2) the charge of the monomeric compound, optionally
(3) the ionic charge on cross-linking agent (1) applied to the coating, and (4) also by charges from cross-linking agent (2) due to hydrolysis of reactive groups.

Of the above four the last three are the more important, as they are concentrated in the uppermost portion. If the monomeric compound is absent or if present in only a relatively small amount, then the ionic charge of the hydrophilic polymer is important.

The reaction (drying) step (c) can be carried out within a broad temperature range, preferably at temperatures of about 70° to 130° C. for a period of about 5 to 30 minutes. Between the single steps a/b, b/c and c/d draining steps (with water of ambient temperature) can be applied in general.

After step (c) an optional step for treating the resultant membrane with an aqueous solution of an at least difunctional cross-linking agent (3) is possible. This step (d) may be necessary and suitable to further stabilize the membrane as a whole and to bind still unreacted monomeric compounds to the coating (hydrophilic polymer). As a rule a curing step after step (d) completes the process for the preparation of the inventive membranes.

The cross-linking agents (3) used should be water-soluble and capable of reacting with the hydrophilic film-forming polymer and/or any unreacted groups of the monomeric ionic compound and/or cross-linking agents (1). Useful cross-linking agents (3) may be those mentioned as cross-linking agents (1) and also those that are excluded as cross-linking agents (1), viz. aromatic cross-linking agents containing acyl halide groups, such as —COCl or —SO$_2$Cl as well as the trihalotriazines (containing chloro, bromo and/or fluoro atoms).

Preferably they are organic compounds containing at least two functional atoms or groups selected from the groups consisting of halogen atoms, or hydroxyl, epoxide, aziridine, aldehyde, imidate, carboxylic acid anhydride, carboxylic acid ester, halogenhydrine, isocyanate, isothiocyanate, sulfonyl halide, carboxylic acid halide, N-methylol or tertiary amino groups, or reactive multiple bonds, wherein the bond or groups may be further substituted, or combinations thereof. Further details of these compounds were mentioned hereinbefore (cf. preferred cross-linking agents (1)).

At least one of the species selected from the hydrophilic polymer used in step (a), the monomeric ionic compound used in the same step and the cross-linking agents used in steps (a), (b) and optional step (d) should contain cationic, amphoteric or preferably anionic groups or groups transferable into anionic groups. Preferred such groups are acid groups of inorganic or organic acids in their salt form (—SO$_3^\ominus$, —OSO$_3^\ominus$, H$_2$PO$_4^\ominus$, —COO$^\ominus$). The cations may be e.g. alkaline metal cations such as K$^\oplus$ and Li$^\oplus$ or preferably Na$^\oplus$.

Groups transferable into anionic groups (upon alkaline hydrolysis) are e.g. acyl chlorides, acyl anhydrides or acyl esters of inorganic or organic acids or said acids when transferred into their salts.

Membranes obtained by the preparation process comprising steps (a) to (d) show good performance and stability. They contain ionic (anionic, cationic, amphoteric) groups or at least polar groups, such as oH- groups.

After this optional step (d), which is carried out at ambient temperature (about 15° to 30° C.) the membrane can be aftertreated by usual steps such as immersion in an aqueous medium, drying and (e) optionally curing at elevated temperatures in the range of 40° to 140° C., preferably 75° to 140° C., and most preferred 90° to 120° C.

The cross-linking agents (3) in optional step (d) are as a rule applied from aqueous solutions (suspensions) containing 0.1 to 10, preferably 0.5 to 10% by weight of the cross-linking agent, based on the weight of the whole solution (suspension).

As mentioned hereinbefore the semipermeable composite membranes obtained according to the inventive process are another object of the present invention.

These inventive membranes suitable for separating organic compounds of low molecular weight from aqueous inorganic salt containing solutions comprise on one side of a membrane support an asymmetrical coating essentially consisting of at least one layer (1) of an organic film-forming, hydrophilic polymer, and a monomeric compound and/or a cross-linking agent, and, a thin semipermeable interfacially cross-linked film (2) containing ionic preferably anionic or amphoteric groups or polar groups, resting on the top of said layer, and being integrally attached thereto, said membrane being prepared by the process mentioned hereinbefore.

The total thickness of the asymmetrical coating on the membrane support is in the range of about 10 to 10.000 nm and the thickness of the semipermeable cross-linked thin film is in the range of about 1 to 5000 nm.

The inventive membranes are useful for separating organic compounds of low molecular weight from aqueous inorganic salts containing solutions. The corresponding method for separating these compounds from said aqueous media, which comprises disposing the solutions on one side of a semipermeable composite membrane and filtering them through the membrane by applying a hydraulic pressure against said solutions and said membrane being greater than the osmotic pressure of said solutions, is a further object of the present invention.

The molecular weight range of the organic compounds to be separated (cut-off level of the inventive membranes) may be less than about 300, preferably between about 150 and 300.

The inorganic salts present in the solutions which are subjected to the membrane treatment (reverse osmosis) are preferably alkali metal salts, such as alkali metal halides or sulfates, e.g. sodium chloride and sodium sulfate.

The inventive membranes are very suitable for membrane separating processes, especially reverse osmosis processes. They can be prepared and used as flat and preferably as tubular membranes in corresponding separation devices, such as modules. They have superior rejection to organic compounds of low molecular weight, good flux properties, superior flexibility and high over all stabilities such as resistance to compaction, to chemical and/or biological degradation.

They are especially useful to recover organic compounds of low molecular weight from chemical reaction solutions or from waste water. These compounds can then be reused or disposed if toxic or dangerous.

The separation effect (the rejection) of the inventive membranes can be measured as follows: a circular membrane with a surface area of 13 cm$^2$, resting on a sintered stainless steel disc, is used in a cylindrical cell made of stainless steel. 150 ml of the solution (to be tested), which contains the substance to be tested in the concentration $c_1$ (g of substance per g of solution), are introduced onto the membrane in the steel cylinder and, using nitrogen, subjected to pressure of 40 bars. The solution is stirred magnetically. The liquid which collects on the outlet side of the membrane is examined to determine its content (concentration) $c_2$ of the substance to be tested, 3 samples of 5 ml each being taken from the start of the experiment. In general, the amount which flows through the membrane and the composition of the 3 samples are constant. The rejection can be calculated from the values obtained, using the equation:

$$R = \frac{c_1 - c_2}{c_1} \cdot 100(\%)$$

The amount of the material passed through the membrane per surface and time unit is found to be:

$$F = V \cdot S^{-1} t^{-1}$$

V: Volume
S: membrane surface area
t: time

F is approcimately expressed in $m^3/m^2 d$, i.e. the number of cubic-meters per square meter surface area of the membrane and per day, or in $1/m^2 \cdot h$, i.e. liters per square meter surface area of the membrane per hour.

In addition to the measurements on flat membranes, measurements on tubular membranes 60 cm long and with an outer diameter of 1.4 cm are also carried out. For this purpose, these tubular membranes are placed in a perforated tube made of stainless steel.

The whole is placed in a tube made of polycarbonate. The outflow from the membrane is between this outer polycarbonate tube and the steel tube. The liquid is added as a stream of the solution in turbulent or laminar fow, under pressure. The flow rate is kept constant at 10 to 15 liters per minute. The rejection (R) and the flux (F) are calculated in the same way as for the flat membranes.

As an example of a low molecular weight organic compound, the triazine derivative of Formula (1) is used in 100 ppm solution alone or together with 10% NaCl present. Further 1% NaCl, 10% NaCl and 1% sodium sulfate solutions are used to test the salt passage.

In the following Examples the compound of formula (1) is used in the test solutions. Compounds of formulae (2) to (6) are used as reactive components in the process for the preparation of the membranes:

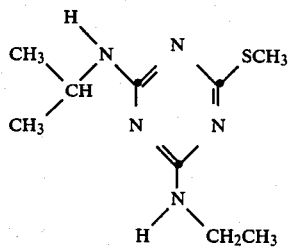

(1)

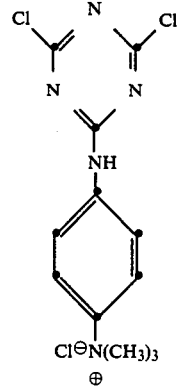

(2)

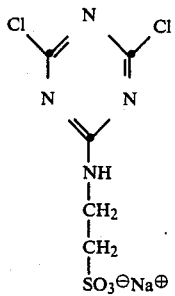

(3)

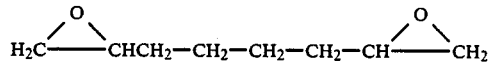

(4)

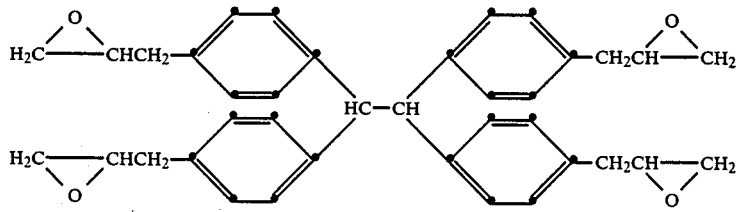

(5)

-continued
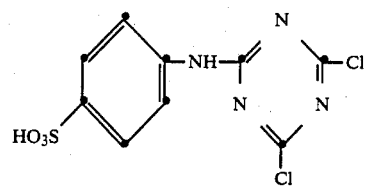 (6)
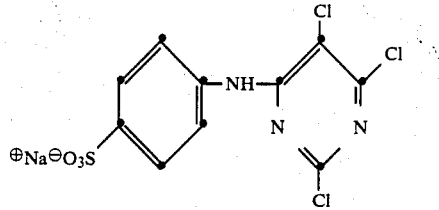 (7)
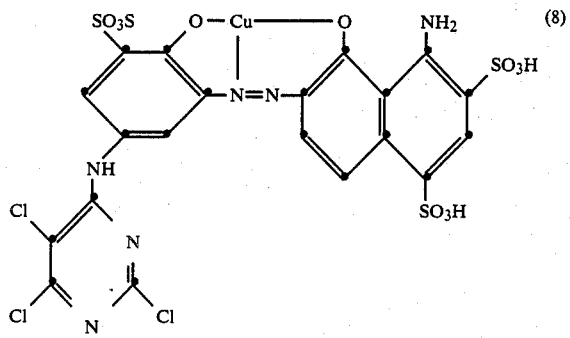 (8)
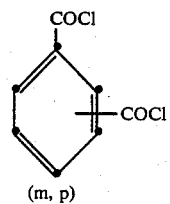 (9)
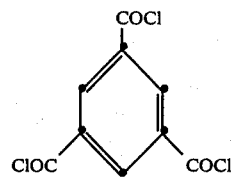 (10)
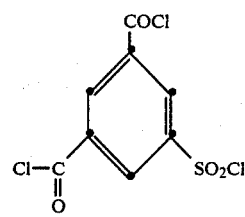 (11)
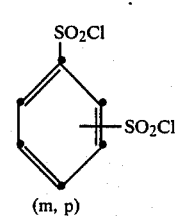 (12)
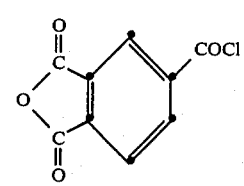 (13)
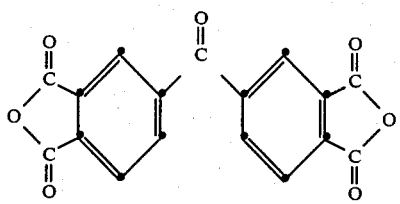 (14)
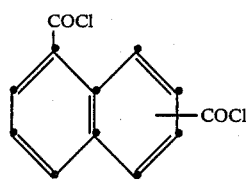 (15)
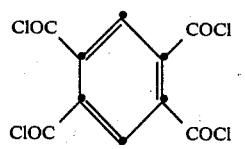 (16)
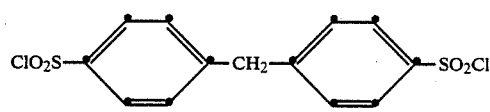 (17)
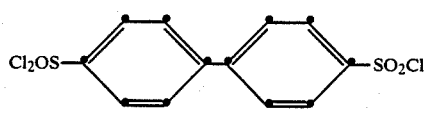 (18)
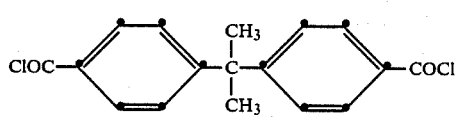 (19)
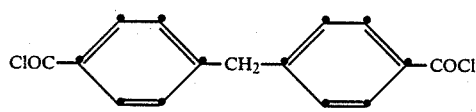 (20)
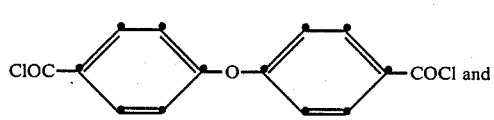 (21)

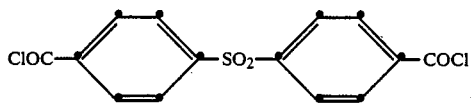

(22)

In the following Examples parts and percentages are by weight. The temperature is indicated in degrees centigrade.

EXAMPLE 1

A 15% solution of a polysulfone (Udel 3500—Registered Trademark) in dimethylformamide (DMF) is cast on a flat sheet of a polyester nonwoven substrate, immersed in an aqueous solution containing 0.5% sodium dodecylsulfonate (SDS), left for 12 hours, and washed for 15 minutes in deionised water. An aqueous solution containing 2% of polyethyleneimine (molecular weight of 30'000) and 2% of the cationic compound of formula (2), the pH of this solution being 10, is coated by spreading it onto the surface of the polysulfone support, left for one minute, drained, and then covered with a 0.3% solution of trimesoyl chloride (TMC) (formula (10)) in n-hexane. After one minute the excess hexane solution is drained and the membrane is heat-treated by placing it in an oven at 115° C. for 10 minutes. The obtained membrane consists of a cationically charged coating with an anionically charged surface on the polysulfone support. After standing at ambient conditions for 12 hours the membrane is tested.

An aqueous solution containing 100 ppm of the test compound of formula (1) and 10% of sodium chloride (test solution) gives a flux of 939 l/m².d and rejections of 96% and 16%, respectively. The test is run at room temperature (20° to 25° C.) and under a pressure of 40 bar. Same conditions are used in all of the following Examples.

A solution containing 100 ppm of the compound of formula (1) alone gives a flux of 2208 l/m²·d and a rejection of 99.2%.

The rejection to 1% sodium sulfate and 1% sodium chloride solutions, under same conditions, is 61 and 70%, respectively.

EXAMPLE 2

Example 1 is repeated, using however an aqueous solution containing 2% of PEI, 2% of cationic compound of formula (2), and 1% of diaminobenzene sulfonic acid (DABS), followed by the TMC (in n-hexanol)-treatment.

An aqueous solution containing 100 ppm of the compound of formula (1) and 10% of sodium chloride gives a flux of 1968 l/m².d and rejections of 95% and 10%, respectively.

The rejections/fluxes to a 100 ppm of the compound of formula (1) solution and a 1% sodium chloride solution are 99.2% and 46%, and 3840 1l/m².d and 3968 l/m².d, respectively.

The addition of DABS significantly increases the flux and lowers the rejection to sodium chloride.

The rejection to a 1% aqueous solution of sodium sulfate is 40% which is slightly less or about the same as the rejection to sodium chloride.

The tests are run under the conditions indicated in Example 1.

When using 1% of diaminobenzoic acid (DABA) instead of DABS membranes are obtained showing the following data:

Flux: 2035 l/m².d

Rejection: 90 and 6% to the compound of formula (1) and sodium chloride, respectively, when using a test solution as indicated above (100 ppm compound of formula (1)/10% sodium chloride).

Comparison of rejection/flux performance for small molecule membranes:

TABLE 1

| | Solutes | | | | | | | |
| --- | --- | --- | --- | --- | --- | --- | --- | --- |
| | Compound of formula (1) 100 ppm | | Nitrotoluene sulfonic acid 100 ppm | | NaCl 1% | | NaCl 10% | |
| Membrane | Flux / | Rej. | Flux / | Rej. | Flux / | Rej. | Flux / | Rej. |
| Example 2 present invention | 3840 | 99.2 | 900 | 92 | 3968 | 46 | 1425 | 5 |
| US-A-4,259,183 Example 2 | 4200 | 40 | 1300 | 76 | 5600 | 56 | 1360 | 3 |
| EP-A-56 175 Example 1 | 3210 | 32 | — | — | 4410 | 14 | 2656 | 10 |

The tests are run at room temperature under a pressure of 40 bar.

Flux: l/m².d; Rejection: %.

The membrane of Example 2 of U.S. Pat. No. 4,259,183 is prepared from piperazine and trimesoyl chloride, present on a polysulfone support.

The membrane of Example 1 of EP-A-No. 56 175 is prepared from PEI (mw 70'000) and trimesoyl chloride on a polysulfone support.

The data of Table 1 demonstrate the superiority of the inventive membranes regarding their rejection capacity to organic low molecular weight compounds.

EXAMPLE 3

Example 1 is repeated using an aqueous solution containing 1% of PEI, 1% of DABS and 0.5% of the anionic triazine crosslinker (compound of formula (3)) instead of the cationic compound of formula (2). The membrane obtained shows a flux for the aqueous test solution according to Example 1 of 1568 l/m².d with 15 and 96% rejections for sodium chloride and the compound of formula (1), respectively.

EXAMPLE 4

Example 3 is repeated using the same amount of DABA instead of DABS. The membrane obtained shows a flux of 2073 l/m².d with rejections of 92% and 13% to the compound of formula (1) and sodium chloride, respectively. The test solution is as in Example 1.

EXAMPLE 5

Example 3 is repeated with an aqueous solution containing 1% of PEI, 1.0% of DABS and 0.5% of the nonionic epoxide of formula (4). The membrane obtained shows a flux and rejections of 1344 l/m².d and 96% and 12% to the compound of formula (1) and sodium chloride, respectively. The rejection to the organic solute without salt is 99.6% with a flux of 2457 l/m².d and to a 1% aqueous sodium chloride solution 40% and 2496 1l/m².d, repsectively. The test solution is as in Example 1.

EXAMPLE 6

Example 5 is repeated, using an aqueous solution containing 1% of PEI, 1% of DABS and 0.25% of ethylamino-2,6-dichloro-triazine instead of the epoxide of formula (4). The flux/rejection of the obtained membrane is 960 l/m².d and 97 and 19%, respectively for the compound of formula (1) and sodium chloride, respectively, when using the test solution of Example 1.

EXAMPLE 7

Example 1 is repeated, using 3% of PEI with 5% of the cationic crosslinker of formula (2). The results for different solutes dissolved in water are given in Table 2 and show a surprising low rejection for sodium sulfate (test conditions: 40 bar, 20° to 25° C.).

TABLE 2

| Solute | Flux (l/m² · d) | Rejection (%) |
|---|---|---|
| 1% Sodium chloride | 1336 | 60 |
| 1% Sodium sulfate | 1342 | 45 |
| Compound of formula (1) (MW 227) | 1693 | 98 |
| Nitrotoluene sulfonic acid | 837 | 90 |

EXAMPLE 8

Example 1 is repeated with a 1% solution of 2-butylamino-4,6-dichlorotriazine in n-hexane instead of TMC. The resulting membrane has a flux and rejections of 1200 l/m².d and 95% and 8% to the compound of formula (1) and sodium chloride, when using the test solution of Example 1.

EXAMPLE 9

Example 1 is repeated to prepare a tubular membrane by casting the polysulfone solution into a spirally wound tube of a polyester nonwoven, and testing the membrane as described. The flux and rejections are 1268 l/m².d with 90% and 15% to the compound of formula (1) and sodium chloride, when using the test solution of Example 1.

EXAMPLE 10

In this example two polymer layers are applied to the support. The first layer contains an excess of cationic groups and the second layer contains an excess of anionic groups. This last layer is further crosslinked. In effect, the polysulfone support of Example 1 is prepared and then coated with an aqueous solution containing 2% of PEI and 5% of the cationic crosslinking agent of formula (3), drained for 15 minutes and coated with an aqueous solution containing 1% of PEI, 0.5% of the epoxide of formula (4) and 1% of DABS, drained for 1 minute and immersed in a 0.3% TMC solution in h-hexane for 2 minutes, drained for 5 minutes and placed in an oven at 115° C. for 10 minutes. After standing in ambient conditions for 12 hours, the membrane has a flux of 1800 l/m².d and rejections of 98% and 8% to the compound of formula (1) and sodium chloride, respectively, when using the test solution of Example 1.

EXAMPLE 11

Example 5 is repeated using 0.5% DABA instead of 1% of DABS and 0.1% of the epoxide of formula (4) instead of 0.5% of this epoxide to prepare a tubular membrane as in Example 9. After drying at 115° C. for 10 minutes the membrane is immersed in an aqueous solution containing 0.5% of the compound of formula (6) and 0.5% of the epoxide of formula (4) for 10 minutes and drained for 12 hours at room temperature. The membrane obtained shows a flux of 820 l/m².d and rejections of 96% and 16% to the compound of formula (1) and sodium chloride, respectively, when using the test solution of Example 1.

EXAMPLE 12

Example 11 is repeated using the compound of formula (2) instead of the compound of formula (6); the membrane is drained for 10 minutes and dried a second time at 115° C. for 15 minutes. The membrane is tested as in Example 11 and shows a flux of 500 1l/m².d with 99% rejection to solute of formula (1) and 15% to sodium chloride.

EXAMPLE 13

Example 11 is repeated without DABA in the coating solution. The resultant membrane has a flux of 750 1l/m².d and a rejection of 94% and 14%, respectively, to solute of formula (1) and sodium chloride, when using the test solution of Example 1.

EXAMPLE 14

Example 12 is repeated without DABA in the coating solution. The resultant membrane has a flux of 511 l/m².d and a rejection of 97% and 14%, respectively, to solute of formula (1) and sodium chloride, when using the test solution of Example 1.

EXAMPLE 15

Example 11 is repeated to prepare a tubular membrane (cf. Example 9) using an n-hexane solution containing 0.3% of TMC and 0.2% of benzene-1,3-disulfonylchloride (see formula (12)) instead of TMC alone.

The membrane obtained shows a flux of 1260 l/m².d and rejections of 98% and 18%, respectively, to the compound of formula (1) and sodium chloride, when using the test solution of Example 1.

A test solution containing 100 ppm of the compound of formula (1) alone gives a flux of 2300 l/m².d and a rejection of 99.8%.

EXAMPLE 16

Example 11 is repeated to prepare a tubular membrane (cf. Example 9) with the difference that after the TMC-step and draining the membrane is placed in a 0.3% toluene-1,3-diisocyanate (TDI) solution in n-hexane for 2 minutes, before continuing with the remaining steps.

The membrane obtained shows a flux of 1010 1l/m².d and rejections of 99% and 15% to the compound of formula (1) and sodium chloride, respectively, when using the test solution of Example 1.

EXAMPLE 17

Example 15 is repeated by using 0.2% of benzene-1-sulfonylchloride-3,5-di-carboxyl chloride instead of the same amount of benzene-1,3-disulfonyl chloride.

The membrane obtained shows a flux of 1220 l/m².d and rejections of 98.6% and 17% to the compound of formula (1) and sodium chloride, respectively, when using the test solution of Example 1.

When a membrane according to Example 11 is made by using benzene-1-sulfonylchloride- 3,5-dicarboxyl chloride (0.3% solution in n-hexane) instead of TMC, the following results are obtained:

Flux: 833 l/m².d

Rejections: 95% (compound of formula (1)), 21% sodium chloride (test solution and conditions as in Example 1).

EXAMPLE 18

(a) Example 11 is repeated using an aqueous solution containing 1% of PEI, 1% of DABS and 0.5% of the anionic diazine cross-linker (compound of formula (7)) instead of the cationic compound of formula (2).

The membrane obtained shows a flux for the aqueous test solution according to Example 1 of 946 l/m².hr and rejections of 98% and 14% for the compound of formula (1) and sodium chloride, respectively.

The flux and rejection data obtained when testing a 1% solution of sulfanilic acid are 99% and 2000 l/m².d.

(b) A membrane is prepared according to (a), but using DABA instead of DABS and with a post-treatment step after the heating or curing step of TMC. This post-treatment comprises the immersion of the membrane in an aqueous solution (pH-value of 10) of 0.5% of the compound of formula (4) and 0.5% of the compound of formula (7), followed by draining the membrane for 2 seconds and placing it in an oven at 115° C. for 15 minutes. After standing at room temperature for 12 hours the membrane obtained shows a flux for the test solution of Example 1 of 2200 1l/m².d and a rejection of 99.6% to the compound of formula (1).

The rejection to sulfanilic acid (using a test solution containing 1% thereof) is 99.5%.

EXAMPLE 19

Example 18(b) is repeated by using in the post-treatment step the compound of formula (8) instead of the diazine compound of formula (7).

The membrane obtained shows a flux of 1420 l/m².d and rejections of 96% and 19% for the compound of formula (1) and sodium chloride, respectively, when using the test solution of Example 1.

EXAMPLE 20

Example 18(b) is repeated, but instead of TMC the compound of formula (16) is used. The membrane obtained shows a flux of 619 l/m².d and rejections of 96% and 19%, respectively, when using the test solution of Example 1.

Instead of the compound of formula (16), compounds of formulae (9) to (15) and (17) to (22) can be used too, to prepare inventive membranes of comparable performance.

What we claim is:

1. A process for the preparation of a semipermeable composite membrane suitable for separating organic compounds of low molecular weight from aqueous, inorganic salts containing solutions, which process comprises the steps of (a) coating one side of a membrane support with an aqueous solution containing dissolved therein an organic, film-forming, hydrophilic polymer, a cross-linking agent (1) and optionally a monomeric ionic compound to form at least one polymer layer, (b) contacting the still wet polymer layer interfacially with an organic solution of at least one cross-linking agent (2), containing at least two functional groups, (c) drying the product of step (b) for a time sufficient to form the composite membrane comprising the membrane support and an asymmetrical coating consisting of at least one polymer layer and a thin semipermeable cross-linked film, containing ionic groups resting on the top of said polymer layer and being integrally attached thereto, (d) optionally treating the membrane of step (c) with an aqueous solution containing cross-linking agents (3) capable of reacting with the polymer and/or unreacted groups of the monomeric compound, at least one of said hydrophilic polymer, monomeric ionic compound and cross-linking agents (1) to (3) used in this process containing cationic, amphoteric, or anionic groups or groups transferable into anionic groups, and (e) optionally curing the membrane of step (d) at elevated temperature.

2. A process according to claim 1, wherein the membrane support is of asymmetrical structure and comprises polymeric materials selected from the group consisting of cellulosics, aromatic polysulfones, polyacrylonitriles and copolymers on the basis of acrylonitrile, polyamides, polyvinyl/vinylidene chlorides and copolymers on the basis of vinyl chloride/vinylidene chloride, epoxy resins, polyphenyleneoxides, polycarbonates, polyheterocyclics, copolymers containing in part heterocyclic rings, polyvinylidene fluorides, polytetrafluoroethylenes, polyesters, polyamides, polyelectrolyte complexes, polyolefines, polyetherimides, polyetherketones, polyamideimides, polyimides and mixtures thereof.

3. A process according to claim 2, wherein the membrane support comprises cellulose acetates, polyacrylonitriles, polyamides, polyvinylidene fluorides, polytetrafluoroethylenes, and preferably aromatic polysulfones.

4. A process according to claim 1, wherein the organic, film-forming hydrophilic polymers contain active hydrogen atoms bound to oxygen, sulfur and preferably to nitrogen.

5. A process according to claim 4, wherein the polymers are selected from the groups consisting of polyethyleneimines, polyvinyl alcohols and partially esterified polyvinyl alcohols, polyvinylamines, polyvinylanilines, cellulose derivatives, polybenzylamines, polyvinylmercaptans. polymers of 2-hydroxyethyl- or 2-aminoethyl-methylarylates, polyvinylimidazolines, amine modified polyepihalogenhydrins, polydiallylamine derivatives, polymers containing piperidine rings, amino polysulfones, amino polyarylene oxides, amine modified polymers on the basis of epoxides, hydrophilic amine groups containing polymers, polyamidepolyamine-epichlorohydrin condensation products, condensation products of dicyandiamide, amine (ammonium) salts and formaldehyde, and copolymers of styrenesulfonate (sodium salt)/vinyl-aniline, 2-amino-ethylmethacrylate/acrylic acid, vinyl-aniline/vinyl-benzyltrimethylammoniumchloride or vinylamine/vinylsulfonate.

6. A process according to claim 5, wherein the polymers are polyvinylalcohols, cellulose derivatives, polyvinylamines, polyvinylanilines, polypiperidines, polydiallylamine derivatives, amine modified polymers on the basis of epoxides, amine modified epihalogenhydrines, the copolymers mentioned in claim 5, or preferably polyethyleneimines.

7. A process according to claim 1, wherein the monomeric compounds are ionic compounds that may react with cross-linking agents (1) to (3), confer charge groups within the polymer layer and/or serve to improve the cross-linking of said polymer layer.

8. A process according to claim 7, wherein the monomeric compounds are ionic aromatic dihydroxy, dimercapto or preferably diamino compounds.

9. A process according to claim 8, wherein the monomeric compounds are dihydroxy, dimercapto or preferably diamino phenyl or naphthyl compounds containing as ionic moieties carboxylic or sulfonic acid or quaternary ammonium, sulfonium and phosphonium groups.

10. A process accdrding to claim 9, wherein the monomeric compounds are 1,4-diaminobenzoic acid, 1,4-diaminosulfonic acid or 1,4-diamino trimethyl ammonium benzene bromide.

11. A process according to claim 1, wherein cross-linking agents (1) are organic compounds that contain at least two functional atoms or groups selected from the groups consisting of non-acyl bound halogen atoms, epoxide, aziridine, aldehyde, imidate, carboxylic acid anhydride, carboxylic acid ester, halogenhydrine, N-methylol or tertiary amino groups, or reactive multiple bonds, wherein the bonds or groups may be further substituted, or combinations thereof.

12. A process according to claim 11, wherein cross-linking agents (1) are halogenodiazines containing at least two reactive halogen atoms or halogenotriazines containing two reactive halogen atoms and optionally ionic groups, carboxylic anhydrides and esters, dialdehydes, chlorohydrin s, and non-ionic di-, tri- or tetra-epoxides.

13. A process according to claim 1, wherein cross-linking agents (2) are those containing the functional groups of cross-linking agents (1), with the proviso that cross-linking agents (2) dissolve in water-immiscible aprotic solvents, and further compounds containing at least two functional groups the compounds being selected from the groups consisting of trihalogenotriazines, containings fluoro, bromo or preferably chloro atoms, isocyanates, isothiocyanates, sulfonyl halides and preferably carboxylic acid halides.

14. A process according to claim 13, wherein cross-linking agents (2) are halogeno diazines, trihalogenotriazines or aromatic, heterocyclic, cycloaliphatic or aliphatic compounds containing as functional groups at least two isocyanate, thiocyanate, sulfonyl halide or carboxylic acid halide groups or mixtures thereof.

15. A process according to claim 14, wherein the cross-linking agents (2) are benzenes, naphthalenes or diphenyl ethers, ketones, sulfones, alkylenes or alkylidenes, pyridines, pyrroles, furans or thiophens, aliphatic or cycloaliphatic compounds of 5 to 12 carbon atoms, containing said functional groups, or halogenodiazines containing at least two reactive halogen atoms or trihalogenotriazines or derivatives thereof.

16. A process according to claim 15, wherein the cross-linking agents (2) comprise the compounds of formulae (9) to (22), toluene-1,3-diisocyanate and a dichloroalkylaminotriazine, or mixtures thereof.

17. A process according to claim 16, wherein the cross-linking agents (2) are isophthaloyl chloride, terephthaloyl chloride, trimesoyl chloride, benzene-1,3-disulfonyl chloride, benzenetetracarboxylic acid chloride, toluene-1,3-diisocyanate or 2-butylamino-4,6-dichloro-1,3,5-triazine, or mixtures of trimesoyl chloride with isophthaloyl chloride, terephthaloyl chloride, benzene-1,3-disulfonyl chloride, toluene-1,3-diisocyanate or 2-butylamino-4,6-dichloro-1,3,5-triazine, applied together or sequentially.

18. A process according to claim 1, wherein the cross-linking agents (3) are organic compounds that contain at least two functional atoms or groups selected from the groups consisting of halogen atoms, or hydroxyl, epoxide, aziridine, aldehyde, imidate, carboxylic acid anhydride, carboxylic acid ester, halogenhydrine, isocyanate, isothiocyanate, sulfonyl halide, carboxylic acid halide, N-methylol or tertiary amino groups, or reactive multiple bonds, wherein the bonds or groups may be further substituted, or combinations thereof.

19. A process according to claim 1, wherein the aqueous solution of step (a) contains cosolvents and 0.1 to 80, preferably 1 to 30% by weight of the polymer and 0.1 to 10, preferably 0.5 to 10% by weight of the monomeric compound and 0.01 to 10%, preferably 0.5 to 10% by weight of the cross-linking agent (1).

20. A process according to claim 1, wherein the organic solution of step (b) contains 0.01 to 15, preferably 0.1 to 1% by weight of cross-linking agent (2) and the aqueous solution of optional step (d) contains 0.1 to 10%, preferably 0.5 to 10% by weight of cross-linking agent (3).

21. A process according to claim 1, wherein steps (a), (b) and (d) are carried out at ambient temperatures, draining steps are used between steps a/b, b/c and c/d, the drying of step (c) is carried out at a temperature of about 70° to 130° C. for a period of about 5 to 30 minutes, and after step (d) the process is completed by curing step (e).

22. A process according to claim 1, which comprises steps (a) to (e).

23. A process according to claim 1, wherein flat or tubular membranes are prepared.

* * * * *